United States Patent
Nomura

(10) Patent No.: US 9,013,138 B2
(45) Date of Patent: Apr. 21, 2015

(54) CHARGING APPARATUS FOR ELECTRIC STORAGE DEVICE, VEHICLE EQUIPPED WITH THE CHARGING APPARATUS, AND METHOD OF CONTROLLING THE CHARGING APPARATUS

(75) Inventor: Yoshihiro Nomura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 337 days.

(21) Appl. No.: 13/528,514

(22) Filed: Jun. 20, 2012

(65) Prior Publication Data

US 2012/0326655 A1 Dec. 27, 2012

(30) Foreign Application Priority Data

Jun. 21, 2011 (JP) ................................. 2011-137263

(51) Int. Cl.
*H02J 7/14* (2006.01)
*H02J 7/04* (2006.01)

(52) U.S. Cl.
CPC *H02J 7/044* (2013.01); *H02J 7/047* (2013.01)

(58) Field of Classification Search
CPC ... H02J 7/0013; H02J 7/0091; B06L 11/1611; Y02T 10/7044; H01M 10/44; G06F 1/3212
USPC ......... 320/104, 107, 124, 128–130, 133, 139, 320/141
See application file for complete search history.

(56) References Cited

U.S. PATENT DOCUMENTS

| 8,148,951 | B2 | 4/2012 | Saito |
| 2009/0001992 | A1 | 1/2009 | Tsuchiya |
| 2010/0097036 | A1* | 4/2010 | Wakayama ................... 320/153 |
| 2010/0164438 | A1 | 7/2010 | Saito |
| 2010/0217466 | A1* | 8/2010 | Ichikawa ........................ 701/22 |
| 2011/0047102 | A1* | 2/2011 | Grider et al. .................. 705/412 |
| 2011/0175569 | A1* | 7/2011 | Austin .......................... 320/109 |
| 2011/0257914 | A1 | 10/2011 | Tsuchiya |
| 2011/0285345 | A1* | 11/2011 | Kawai et al. .................. 320/107 |
| 2012/0200160 | A1* | 8/2012 | Pratt et al. ....................... 307/48 |

FOREIGN PATENT DOCUMENTS

| JP | 2007-178215 A | 7/2007 |
| JP | 2009-072029 A | 4/2009 |
| JP | 2010-136555 A | 6/2010 |

* cited by examiner

*Primary Examiner* — Paul Dinh
(74) *Attorney, Agent, or Firm* — Gifford, Krass, Sprinkle, Anderson & Citkowski, P.C.

(57) ABSTRACT

A charging apparatus includes an electric power supply device and a control device. The control device that estimates a first region in which first charging power is supplied from the electric power supply device to a electric storage device; estimates a second region, in which second charging power that is smaller than the first charging power is supplied from the electric power supply device to the electric storage device, based on temperature of the electric storage device and a state-of-charge of the electric storage; estimates a first charging time that corresponds to the first region; estimates a second charging time that corresponds to the second region; estimates a total charging time by using the first charging time and the second charging time; obtains a charging completion time; and sets a charging start time based on the charging completion time and the total charging time.

18 Claims, 9 Drawing Sheets

CHARGING APPARATUS FOR ELECTRIC STORAGE DEVICE, VEHICLE EQUIPPED WITH THE CHARGING APPARATUS, AND METHOD OF CONTROLLING THE CHARGING APPARATUS

CROSS REFERENCE TO RELATED APPLICATIONS

This application claims priority to Japanese Patent Application No. 2011-137263 filed on Jun. 21, 2011, which is incorporated herein by reference in its entirety including the specification, drawings and abstract.

BACKGROUND OF THE INVENTION

1. Field of the Invention

The invention relates to a charging apparatus for an electric storage device, a vehicle equipped with the charging apparatus, and a method of controlling the charging apparatus.

2. Description of Related Art

In recent years, vehicles that run with driving force using electric power stored in an electric storage device installed on the vehicle have been attracting attention, as environment-conscious vehicles. Examples of the electric storage device include a second battery and a capacitor. The vehicles of the above type include, for example, electric vehicles, hybrid vehicles, fuel-cell vehicles, etc. It has been proposed to charge the electric storage device installed on the above type of vehicle, using a commercial power supply. Generally, the commercial power supply has high power generation efficiency.

As one type of the hybrid vehicles, a vehicle that permits an on-board electric storage device to be charged using electric power from a power supply located outside the vehicle (which may also be simply called "external power supply"), like an electric vehicle, is known. The charging of the on-board electric storage device with electric power from the external power supply may also be simply called "external charging". Typically, the vehicle as described above is known as so-called "plug-in hybrid vehicle". For example, a charge port or socket provided on the plug-in hybrid vehicle is connected to an outlet of a power supply provided in a house, or the like, via a charging cable. With this arrangement, the on-board electric storage device can be charged with electric power from a standard home power supply. By using the external power supply, it is expected to enhance the fuel consumption efficiency of the hybrid vehicle.

Japanese Patent Application Publication No. 2007-178215 (JP 2007-178215 A) discloses a power supply system capable of charging a secondary battery. The power supply system restricts charging current in view of the temperature dependence of the internal resistance of the secondary battery. With the charging current thus restricted, the charging status (which may also be called "state of charge" or "SOC") of the secondary battery is estimated with improved accuracy, as described in JP 2007-178215 A.

A vehicle capable of external charging assures a long running distance if the electric storage device is in a sufficiently charged state when driving of the vehicle is started next time. In the meantime, if the electric storage device is kept in a high SOC condition for a long period of time, degradation of the electric storage device may be accelerated. Therefore, a vehicle having a timer charging function has been proposed. The user of the vehicle sets a scheduled time at which charging is to be completed (or a scheduled time at which driving of the vehicle is to be started). The charging of the electric storage device is controlled so as to maximize the SOC immediately before the scheduled time set by the user.

In the vehicle having the timer charging function as described above, if the estimated charging time of the electric storage device is not accurate, a shortage of charge may occur at the scheduled charging completion time, or charging may be completed earlier than scheduled. In the latter ease, the electric storage device may be kept in a high SOC condition for a long period of time, which may result in degradation of the electric storage device.

In the meantime, charging power that can be received by the electric storage device may be restricted by the temperature and SOC of the electric storage device. Therefore, it is important to take account of charging characteristics of the electric storage device, for accurate estimation of the charging time.

SUMMARY OF THE INVENTION

The invention provides a charging apparatus that estimates the charging time of an electric storage device with improved accuracy, a vehicle equipped with the charging apparatus, and a method of controlling the charging apparatus.

A charging apparatus according to a first aspect of the invention includes an electric power supply device and a control device. The electric power supply device adjusts electric power from a power supply, and supplies charging power to the electric storage device. The control device estimates a first region in which first charging power is supplied from the electric power supply device to the electric storage device; estimates a second region, in which second charging power that is smaller than the first charging power is supplied from the electric power supply device to the electric storage device, based on temperature of the electric storage device and a state-of-charge of the electric storage; estimates a first charging time that corresponds to the first region; estimates a second charging time that corresponds to the second region; estimates a total charging time by using the first charging time and the second charging time; obtains a charging completion time; and sets a charging start time based on the charging completion time and the total charging time.

A vehicle according to a second aspect of the invention includes an electric storage device, a drive unit, an electric power supply device and a control device. The drive unit generates driving force for running the vehicle, using electric power supplied from the electric storage device. The electric power supply device adjusts electric power from a power supply, and supplies charging power to the electric storage device. The control device estimates a first region in which first charging power is supplied from the electric power supply device to the electric storage device; estimates a second region, in which second charging power that is smaller than the first charging power is supplied from the electric power supply device to the electric storage device, based on temperature of the electric storage device and a state-of-charge of the electric storage; estimates a first charging time that corresponds to the first region; estimates a second charging time that corresponds to the second region; estimates a total charging time by using the first charging time and the second charging time; obtains a charging completion time; and sets a charging start time based on the charging completion time and the total charging time.

A method of controlling a charging apparatus according to a third aspect of the invention includes: estimating a first region in which first charging power is supplied from the electric power supply device to the electric storage device, estimating a second region, in which second charging power that is smaller than the first charging power is supplied from the electric power supply device to the electric storage device, based on temperature of the electric storage device and a state-of-charge of the electric storage, estimating a first charging time that corresponds to the first region, estimating a second charging time that corresponds to the second region, estimating a total charging time by using the first charging time and the second charging time, obtaining a charging completion time, and setting a charging start time based on the charging completion time and the total charging time.

According to the above aspects of the invention, the charging time of the electric storage device is estimated with improved accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described in detail with reference to the drawings.

Figure 1:
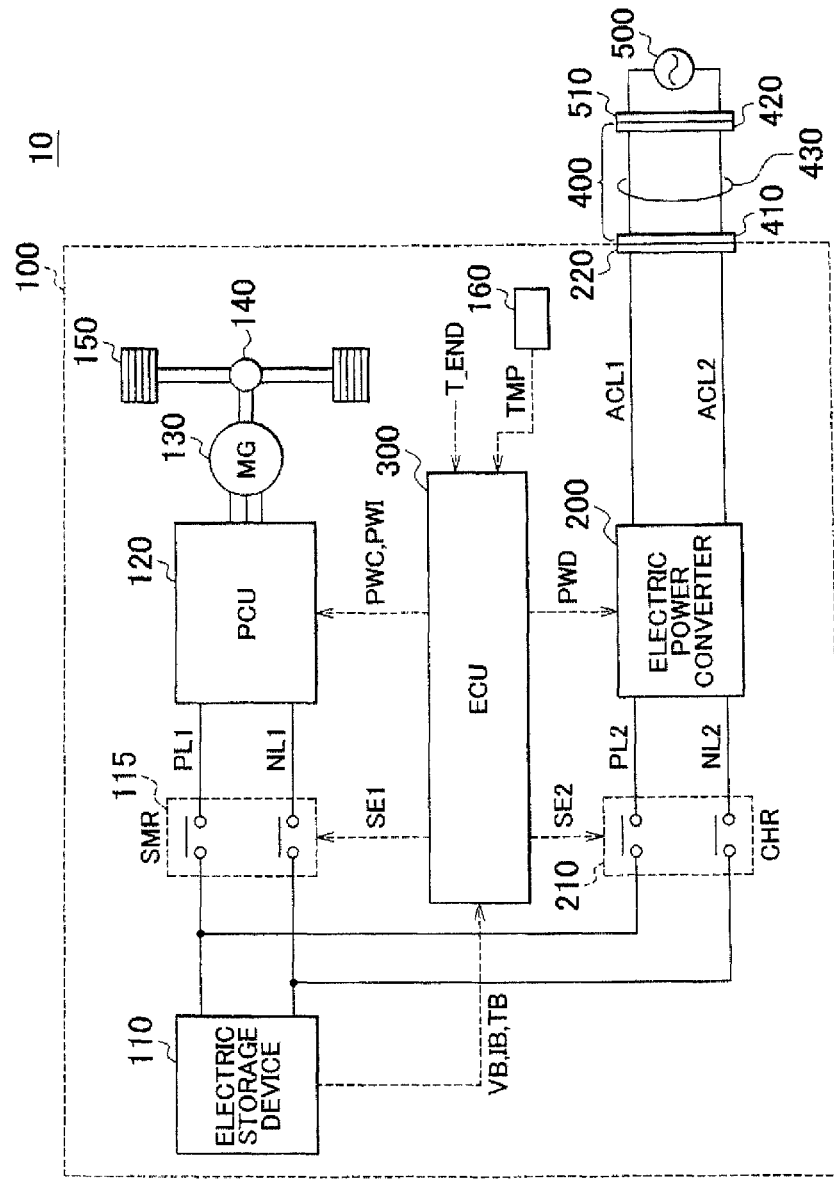
FIG. 1 is an overall block diagram of a charging system according to one embodiment of the invention.

FIG. 1 is an overall block diagram of a charging system 10 according to the embodiment of the invention. The charging system 10 includes a vehicle 100. The vehicle 100 includes an electric storage device 110, a system main relay (SMR) 115, a power control unit (PCU) 120 as a drive unit, a motor-generator 130, power transmission gears 140, driving wheels 150, an outside air temperature sensor 160, and an electronic control unit (ECU) 300 as a control device.

The electric storage device 110 is an electric power storage component adapted to be charged and discharged. The electric storage device 110 may be selected from, for example, secondary batteries, such as a lithium-ion battery, a nickel-metal hydride battery, and a lead storage battery, and electric storage elements, such as an electric double layer capacitor.

The electric storage device 110 is connected to the PCU 120 via power lines PL1, NL1. In operation, the electric storage device 110 supplies electric power to the PCU 120 so as to generate driving force for running the vehicle 100 (which will be called "vehicle driving force"). Also, electric power generated by the motor-generator 130 is stored in the electric storage device 110. The output of the electric storage device 110 is about 200V, for example.

Although not shown in the drawings, the electric storage device 110 is provided with a voltage sensor, a current sensor, and a storage device temperature sensor. The voltage sensor measures voltage VB of the electric storage device 110. The current sensor measures input current applied to the electric storage device 110, or output current ID from the electric storage device 110. The storage device temperature sensor measures the temperature TB (which will also be called "storage device temperature TB") of the electric storage device 110. The voltage sensor, the current sensor, and the storage device temperature sensor respectively output values of the measured voltage VB, current IB and storage device temperature TB to the ECU 300. The ECU 300 computes the SOC of the electric storage device 110, based on these measurement values.

The SMR 115 is provided between the electric storage device 110 and the power lines PL1, NL1. The SMR 115 has a relay that switches between a position for allowing supply of electric power between the electric storage device 110 and the PCU 120, and a position for cutting off supply of electric power therebetween, based on a control signal SE1 from the ECU 300.

The PCU 120 includes a converter, an inverter, and so forth, which are not shown in the drawings. The converter converts voltage supplied from the electric storage device 110 to the PCU 120 when it is controlled according to a control signal PWC from the ECU 300. The inverter drives the motor-generator 130, using electric power converted by the converter, when it is controlled according to a control signal PWI from the ECU 300.

The motor-generator 130 is an alternating-current rotating electrical machine. For example, the motor-generator 130 is a permanent magnet type synchronous motor including a rotor in which permanent magnets are embedded.

The output torque of the motor-generator 130 is transmitted to the driving wheels 150 via the power transmission gears 140, to run the vehicle 100. The power transmission gears 140 include reduction gears and a power split device. The motor-generator 130 generates electric power, using rotative force of the driving wheels 150, during regenerative braking of the vehicle 100. The electric power thus generated is converted by the PCU 120 into electric power for charging the electric storage device 110.

In FIG. 1, the vehicle 100 having one motor-generator and one inverter is illustrated. However, the number of motor-generator(s) and inverter(s) is not limited to one. Rather, two or more generators and inverters may be provided.

FIG. 1 illustrates an example in which the vehicle 100 is an electric vehicle. However, the vehicle 100 of this embodiment may be a hybrid vehicle that generates vehicle driving force by way of an engine and an electric motor, or a fuel-cell vehicle on which a fuel cell system is installed, as well as the electric vehicle. Namely, the vehicle 100 of this embodiment may be any type of vehicle provided that it runs with an electric motor driven by electric power stored in the electric storage device 110.

In the case of the hybrid vehicle, the motor-generator 130 is also coupled to an engine (not shown) via the power transmission gears 140. In this case, the ECU 300 causes the engine and the motor-generator 130 to operate in coordination with each other, so as to obtain required vehicle driving force. In this case, the electric storage device 110 may be charged, using electric power generated due to revolution of the engine.

The outside air temperature sensor 160 measures an ambient temperature outside the vehicle. Then, the outside air temperature sensor 160 outputs a value of the measured temperature TMP to the ECU 300.

The vehicle 100 further includes an inlet 220, an electric power converter 200, and a charging relay (CHR) 210. The inlet 220, electric power converter 200, and the CHR 210 are elements for charging the electric storage device 100, using electric power from an external power supply 500. The "electric power converter 200" in this embodiment functions as the "electric power supply device" of the invention.

The inlet 220 is provided on an outer surface of the vehicle 100. A connector 410 of a charging cable 400 is connected to the inlet 220. In operation, electric power is transmitted from the external power supply 500 to the vehicle 100 via the charging cable 400. Namely, the inlet 220 is a socket used for supply of electric power to the vehicle 100.

The charging cable 400 includes the connector 410, a plug 420, and a wire portion 430. The charging cable 400 is connected to an outlet or socket 510 of the external power supply 500 via the plug 420. The wire portion 430 electrically connects the connector 410 with the plug 420. Although not shown in FIG. 1, the wire portion 430 may include a charging circuit interrupt device (CCID). The CCID is operable to switch between a position for allowing supply of electric power from the external power supply 500 to the vehicle 100, and a position for cutting off supply of electric power from the external power supply 500 to the vehicle 100.

The electric power converter 200 is connected to the inlet 220 via power lines ACL1, ACL2. The electric power converter 200 is also connected to the electric storage device 110 via power lines PL2, NL2.

The electric power converter 200 is controlled according to a control signal PWD from the ECU 300, to convert ac (alternating current) power supplied from the inlet 200, into electric power for charging the electric storage device 110.

The CHR 210 is provided between the electric storage device 110 and the power lines PL2, NL2. The CHR 210 has a relay that switches between a position for allowing supply of electric power from the electric power converter 200 to the electric storage device 110, and a position for cutting off the supply of electric power, based on a control signal SE2 from the ECU 300.

The ECU 300 includes a central processing unit (CPU), a memory or storage device, and an input/output buffer, which are not shown. The ECU 300 receives signals from respective sensors, etc., and generates control signals to respective devices or equipment, while controlling the vehicle 100 and respective devices. The control of the vehicle 100 and respective devices is not limited to processing using software, but may be implemented by processing using exclusive hardware (electronic circuit).

The ECU 300 receives a scheduled charging completion time T_END entered through an operation of the user. Then, the ECU 300 carries out timer charging control so as to cause the electric storage device 110 to reach a certain charging status at the scheduled charging completion time T_END. In the timer charging control, the ECU 300 estimates a required charging time from charging characteristics of the electric storage device 110, based on the storage device temperature TB and the SOC. Here, the required charging time is the time required for the electric storage device 110 to reach the certain charging status. For example, the required charging time may be the time required for the electric storage device 110 to be fully charged. Then, the ECU 330 determines a charging start time from the estimated charging time, and carries out charging of the electric storage device 110 by driving the electric power converter 200 when the charging start time is reached. The timer charging control will be specifically explained below in greater detail.

Figure 2:
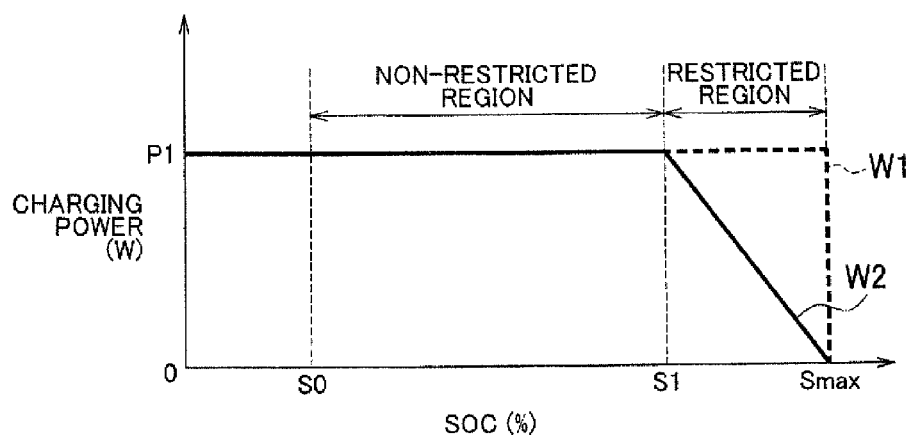
FIG. 2 is a first view showing restriction of charging power by SOC, in a first embodiment of the invention.

FIG. 2 is a view indicating the relationship between the SOC of the electric storage device 110 and the charging power. Namely, FIG. 2 shows restriction of the charging power by the SOC. Referring to FIG. 2, the case where charging is conducted from a condition in which the SOC is S0, which condition is established before charging of the storage device 110 is started, to a condition in which the electric storage device 110 is fully charged, or the SOC is Smax, will be considered. While the SOC is within the range from S0 to S1 in FIG. 2, the electric storage device 110 is charged with a predetermined, constant charging power P1. For example, the charging power P1 may be determined based on the maximum electric power that can be received by the electric storage device 110, or may be determined based on the maximum output power that can be generated from the electric power converter 200. For example, the charging power P1 may be determined based on the rated charging power in the charging system 10 of FIG. 1.

In this embodiment, a region in which the SOC is between S1 and Smax is referred to as a relatively high SOC region. In the high SOC region, the charging power generated to the electric storage device 110 is set to a power level that is smaller than the above-indicated charging power P1, as indicated by the line W2 in FIG. 2.

In the high SOC region, each electric storage element (not shown) included in the electric storage device 110 has a reduced capacity that can receive energy. This is because the rate or speed of chemical reactions occurring in the electric storage elements is reduced to be lower than that in the case where the SOC is low. If the reactions occur in the electric storage elements at the reduced rate, electric power is not sufficiently received by the electric storage elements when charged with large charging power as indicated by the broken line W1 in FIG. 2. Where the electric storage device 110 is a lithium-ion battery, for example, metal Li may be deposited due to electric energy that fails to be received. In this case, the degradation of the electric storage elements may be accelerated.

In this embodiment, the charging time (total charging time) it takes until the electric storage device 110 reaches the fully charged state is determined by obtaining the total sum of the charging time in a region (which will be called "non-restricted region") in which the SOC is within the range of S0 to S1, and the charging time in a region (which will be called "restricted region") in which the SOC exceeds S1.

Figure 3:
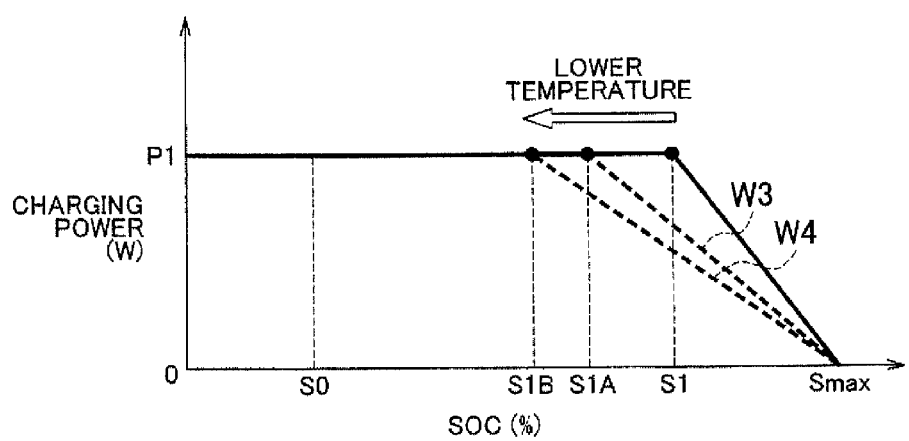
FIG. 3 is a second view showing restriction of charging power by SOC, in the first embodiment of the invention.

The charging characteristics of the electric storage device 110 are also influenced by the storage device temperature TB. Generally, the rate of chemical reactions in the electric storage elements is reduced (i.e., the chemical reactions in the electric storage elements are slowed down) as the storage device temperature TB is lower. Therefore, if the storage device temperature TB is low, electric power that can be received by the electric storage device 110 is reduced even with the same SOC, as described above. Namely, as the storage device temperature TB decreases, the value of the SOC at which the restriction starts and switching from the non-restricted region to the restricted region occurs changes from S1 to S1A, and then to S1B, as indicated by broken lines W3, W4 in FIG. 3. Thus, the total charging time it takes until the electric storage device 110 reaches the fully charged state varies due to variations in the storage device temperature TB when the charging operation is carried out.

The timer charging control is performed based on the scheduled charging completion time entered by the user. If the charging time or duration varies due to variations in the storage device temperature TB, as described above, the actual charging completion time deviates from the scheduled charging completion time. Therefore, the amount of charge may be insufficient or less than required at the scheduled charging completion time, or charging may be completed earlier than the scheduled charging completion time. If charging is completed earlier than the scheduled time, the degradation of the electric storage device 110 may be accelerated.

Next, a method of estimating the charging time according to a first embodiment of the invention will be described. In FIG. 2, the charging operation is carried out using the substantially constant, charging power P1 in the non-restricted region. Therefore, the charging time t1 in the non-restricted region is calculated according to the following equation (1), where ENGR is the rated amount of charging power of the electric storage device 110.

$$t1 = ENGR \div P1 \times (S1 - S0) \div 100 \quad (1)$$

In the above equation (1), the unit of ENGR may be Wh, and the unit of S1 and S0 may be %, while the unit of P1 may be W. In this case, the unit of t1 is hour. Also, ENGR corresponds to the amount of electric power stored in the electric storage device 100 when it is in the fully charged state.

Figure 4:
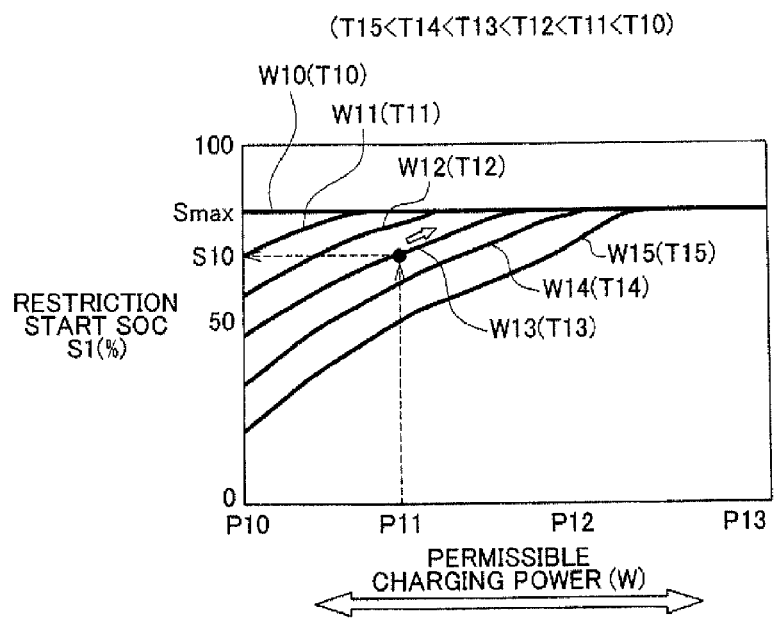
FIG. 4 is a view showing the relationship between the temperature of the electric storage device and the SOC at which the restriction is started.

As described above with reference to FIG. 3, S1 as the SOC at which the restriction starts (which may also be called "restriction start SOC") varies depending on the storage device temperature TB. In this embodiment, S1 is computed from a map as shown in FIG. 4. FIG. 4 is one example of map indicating the relationship between the permissible charging power of the electric storage device 110 and the restriction start SOC. FIG. 4 also indicates the relationship between the temperature of the electric storage device 110 and the restriction start SOC. With regard to each of the cases where the storage device temperature TB of the electric storage device 110 is T10-T15, the relationship between the permissible charging power and the restriction start SOC is represented by a corresponding one of curves W10-W15. The relationship of the temperatures T10-T15 is expressed as T15<T14<T13<T12<T11<T10. In FIG. 4, the permissible charging power on the horizontal axis becomes larger toward P10 (i.e., in the direction from right to left in FIG. 4).

As is understood from FIG. 4, if the charging power is equal, the restriction start SOC is smaller as the storage device temperature TB is lower. Also, if the storage device temperature TB is equal, the restriction start SOC is smaller as the charging power is larger. For example, when the storage device temperature TB is T13, and the charging power is P11, the restriction of charging power is started when the SOC increases up to S10. Namely, the charging power supplied to the storage device is restricted while P11 is set as the permissible charging power.

Figure 5:
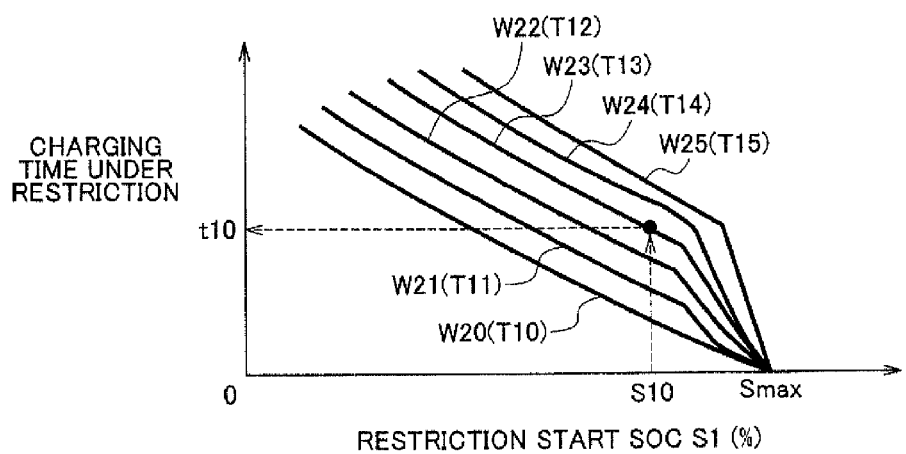
FIG. 5 is a view showing an example of map used for computing the charging time when the charging power is restricted.

Then, as the SOC increases from S10, the permissible charging power is restricted (reduced) along the curve W13, from P11 toward P12. Thus, after the SOC reaches a point at which the restriction of the charging power starts, the charging power varies along the predetermined curve. Therefore, once the restriction start SOC is determined, the charging time t10 in the restricted region is almost uniquely determined using the map as shown in FIG. 5.

As described above, the SOC (S1) at which the restriction of the charging power starts is computed from the storage device temperature TB and the charging power (P1) in the non-restricted region. Then, the charging time (t1) in the non-restricted region is computed using Eq. (1) indicated above. Also, the charging time (t10) in the restricted region is computed from the map as shown in FIG. 5. Then, the total charging time is computed by summing t1 and t10.

Thus, the charging time in the non-restricted region in which the electric storage device 110 is charged with substantially constant charging power is computed using a simple equation like Eq. (1). On the other hand, the charging time in the restricted region in which the charging power is varied is computed using a map determined in advance by experiment, or the like. This makes it possible to easily and accurately estimate the charging time, without increasing a computation load as in a method using sequential calculation.

The storage device temperature TB of the electric storage device 110 used in the above computation is required to be set to a temperature measured when charging is actually started (which will also be called "charging start temperature"). The charging start temperature may be estimated in view of the temperature of the electric storage device 110 measured at the time when the charging completion time is entered by the user, the ambient temperature TMP, the approximate time it takes until charging is started, etc. Further, a map, or the like, may be used in estimation of the charging start temperature. If the time until the start of charging is sufficiently long (for example, 5 to 6 hours), the storage device temperature TB is supposed to be approximately equal to or close to the outside air temperature. In this case, the charging start temperature may be estimated, using changes in the ambient temperature in an average day according to the season. In the case where charging is conducted at almost the same time everyday, the average temperature of the electric storage device 110 measured upon start of charging in the latest several days may be used as the charging start temperature.

Figure 6:
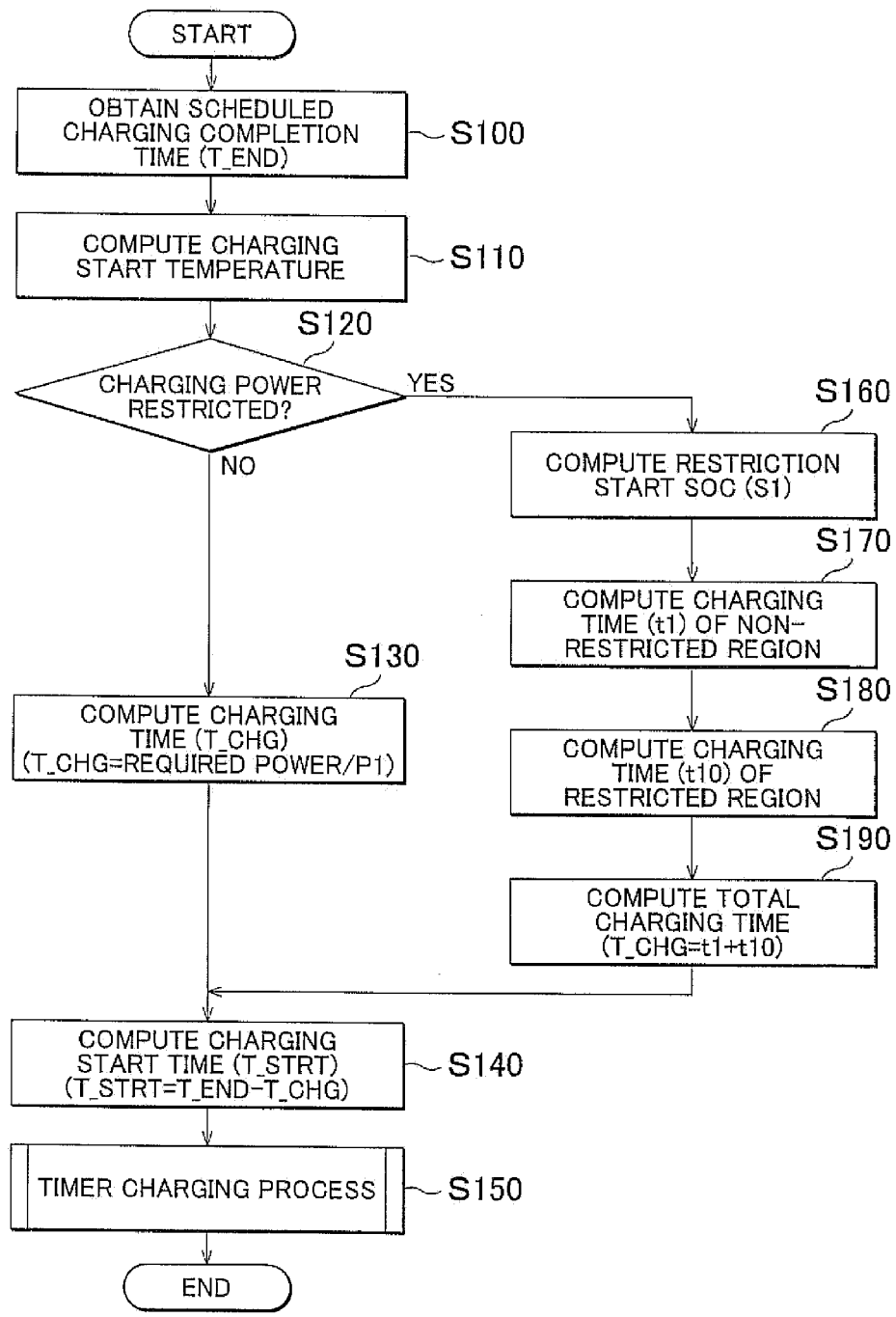
FIG. 6 is a flowchart illustrating a charging control process performed by an ECU in the first embodiment.

FIG. 6 is a flowchart illustrating a charging control process performed by the ECU 300. The flowcharts shown in FIG. 6 and FIG. 9 (which will be described later) are implemented by executing programs stored in advance in the ECU 300, at predetermined intervals. The charging control process may also be performed by constructing exclusive hardware (electronic circuit) so as to execute a part of the steps in the flowchart.

Referring to FIG. 6, the charging control process performed by the ECU 300 will be described. In step S100, the ECU 300 obtains the scheduled charging completion time T_END entered by the user.

Then, in step S110, the ECU 300 computes the charging start temperature, based on the current storage device temperature TB, the ambient temperature TMP, and so forth.

Then, in step S120, the ECU 300 determines whether the charging power is restricted by the SOC, during execution of the charging operation. Whether the charging power is restricted or not is determined by using the map as shown in FIG. 4, based on the charging start temperature computed in step S110, and the charging power normally used in the non-restricted region.

In the case of the curve W10 in FIG. 4 (where the charging start temperature is equal to temperature T10), for example, the charging power is not restricted by the SOC. Also, when the charging power used in the non-restricted region is P13 in FIG. 4, the charging power is not restricted until the electric storage device 110 reaches the fully charged state.

When the charging power is not restricted (NO in step S120), there is no restricted region. In this case, the electric storage device 110 is charged with constant charging power until it reaches Smax representing the fully charged state, as indicated by the line W1 in FIG. 2. Therefore, the control proceeds to step S130 in which the ECU 300 estimates the total charging time T_CHG; according to Eq. (1). In step S130, ENGR×(S1−S0)÷100 is defined as the required amount of electric power. In this case, S1=Smax.

Then, the ECU 300 computes the charging start time T_STRT in step S140. The charging start time T_STRT is a value obtained by subtracting the total charging time T_CHG estimated in step S130, from the scheduled charging completion time T_END entered by the user.

Then, in step S150, the ECU 300 drives the electric power converter 200 to carry out a charging operation for charging the electric storage device 110. Namely, a timer charging process is performed. The timer charging process is executed in response to a determination that the time has reached the charging start time T_STRT calculated in step S130.

When the charging power is restricted (YES in step S120), on the other hand, the control proceeds to step S160 in which the ECU 300 computes SOC (S1) at which the restriction starts. As explained above with reference to FIG. 4, the SOC (S1) is computed, using the map as shown in FIG. 4, from the charging start temperature computed in step S110 and the charging power normally used in the non-restricted region.

Then, in step S170, the ECU 300 computes the charging time t1 in the non-restricted region, using Eq. (1) as indicated above. Also, in step S180, the ECU 300 computes the charging time t10 in the restricted region, using the map as shown in FIG. 5.

In step S190, the ECU 300 computes the total charging time T_CHG, by adding the computation results of steps S170 and S180. Then, the ECU 300 computes the charging start time T_STRT in step S140. In step S150, the ECU 300 performs the timer charging process, using the charging start time T_STRT.

By performing control according to the process as described above, the charging time is estimated by separately obtaining the charging time in the region (restricted region) in which the charging power is restricted by the charging characteristics of the electric storage device, and the charging time in the region (non-restricted region) in which the charging power is not restricted. Namely, the charging time is estimated in view of the SOC, the temperature, etc. of the electric storage device. As a result, the charging time of the electric storage device is estimated with improved accuracy. Also, the charging time of the non-restricted region is computed according to a simple equation, and the charging time of the restricted region is computed using a predetermined map. Thus, the computation load on the ECU in estimation of the charging time is less likely or unlikely to be increased.

According to the first embodiment, the shortage of charging at the scheduled charging completion time set by the user is resolved or eliminated. Also, the degradation of the electric storage device, which would appear when the charging operation is completed early and the storage device is kept in a high SOC condition for a long period of time, is curbed or suppressed.

In the first embodiment, when the charging power is not restricted by the charging characteristics of the electric storage device, the electric storage device is charged at the same charging power level.

Meanwhile, even when the charging power is not restricted by the charging characteristics of the electric storage device, the electric storage device may be charged with charging power selected from two or more charging power levels. In a second embodiment of the invention, charging control similar to that of the first embodiment is applied to the case where the storage device is charged with charging power selected from two or more charging power levels according to the SOC, namely, where the charging power is switched from one level to another, depending on the SOC.

Figure 7:
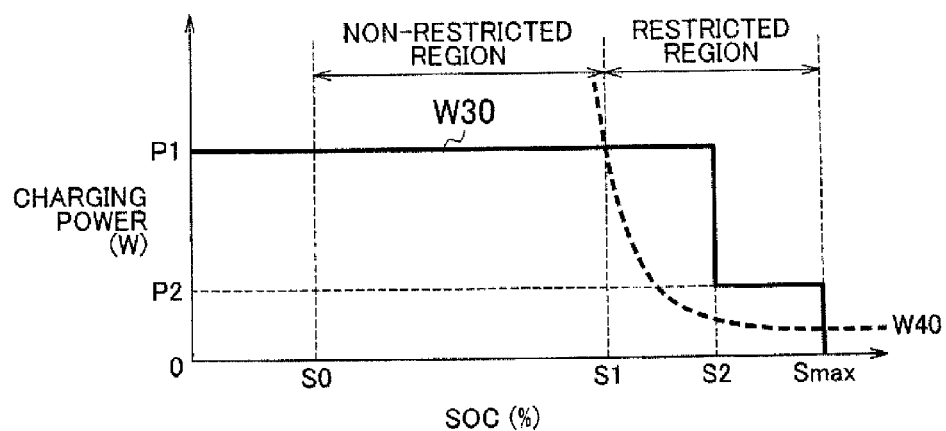
FIG. 7 is a first view showing restriction of charging power by SOC, in a second embodiment of the invention.
Figure 8:
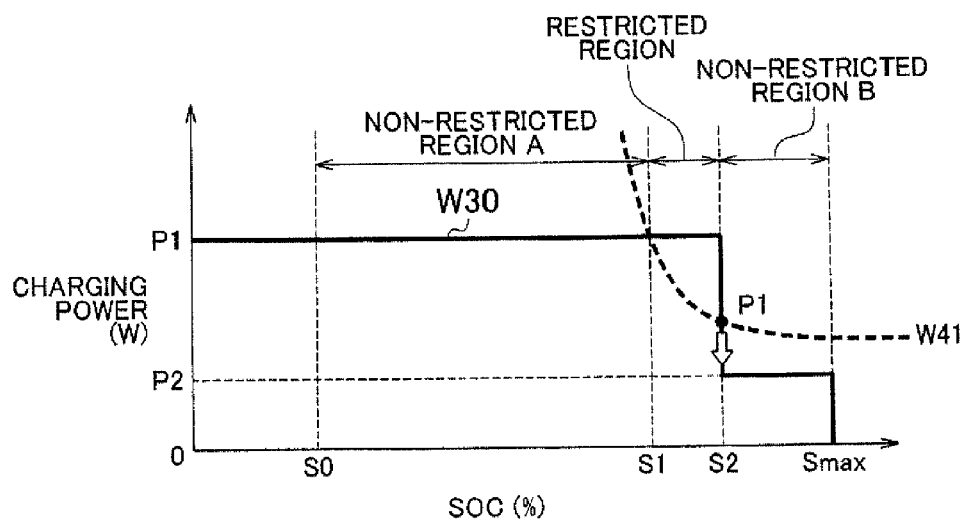
FIG. 8 is a second view showing restriction of charging power by SOC, in the second embodiment of the invention.

FIG. 7 is a first view useful for explaining switching of the charging power level according to the SOC, and restriction of the charging power by the charging characteristics of the electric storage device 110, according to the second embodiment. FIG. 8 is a second view useful for explaining switching of the charging power level according to the SOC, and restriction of the charging power by the charging characteristics of the electric storage device 110, according to the second embodiment. In FIG. 7 and FIG. 8, curves W40, W41 represent charging power restricted by the charging characteristics of the electric storage device 110. The curves W40, W41 correspond to the lines W2, W3, W4 in FIG. 2 and FIG. 3.

Referring first to FIG. 7, in the case where the charging power is not restricted by the charging characteristics of the electric storage device 110, the electric storage device 110 is charged using charging power P1 when the SOC is smaller than S2, as indicated by the solid line W30 in FIG. 7. When the SOC is larger than S2, on the other hand, the electric storage device 110 is charged using charging power having a power level P2 (P2<P1) that is lower than the charging power P1.

As explained above with reference to FIG. 2, the electric power that can be received by the electric storage device 110 is reduced in a high SOC region. In this case, for example, the charging power in the high SOC region may be reduced in advance. Namely, the charging power level may be switched to a lower level when the electric storage device 110 enters the high SOC region.

In another case, the electric storage device 110 may be charged using large electric power in a low SOC region so that charging is conducted in a short time, and may be charged using small electric power in a high SOC region, so that excess voltage is prevented from being applied to the electric storage device 110.

In FIG. 7, the restriction of the charging power by the charging characteristics of the electric storage device 110 is represented by the broken line W40. When the charging power is restricted in the case where two-level setting of the charging power is performed (i.e., the charging power is selected from two levels) as described above, the charging power as indicated by the broken line W40 falls below the charging power as indicated by the solid line W3 in the range from S1 to Smax. In this case, the range between S1 and Smax is the restricted region of the charging power. As in the first embodiment, in the non-restricted region in which the SOC is smaller than S1, the charging time is computed using Eq. (1). On the other hand, in the restricted region in which the SOC is larger than S1, the charging time is computed using the map as shown in FIG. 5.

In the example of FIG. 8, the charging power as indicated by the broken line W41 is smaller than the charging power as indicated by the solid line W30 in the SOC range from S1 to S2, whereas the charging power as indicated by the solid line W30 is smaller than the charging power as indicated by the broken line W41 in the SOC range from S2 to Smax. Accordingly, in the example of FIG. 8, the electric storage device 110 is charged with the charging power P1 in the SOC range from S0 to S1. On the other hand, the electric storage device 110 is charged with the charging power that varies along the broken line W41 in the SOC range from S1 to S2. Then, the electric storage device 110 is charged with the charging power P2 in the SOC range from S2 to Smax.

Namely, the SOC range from S0 to S1 is denoted as a non-restricted region A, and the SOC range from S2 to Smax is denoted as a non-restricted region B, while the SOC range from S1 to S2 is denoted as a restricted region.

Therefore, the charging time in each of the non-restricted regions A, B is computed according to Eq. (1), and the charging time in the restricted region is computed using the map as shown in FIG. 5. More specifically, the charging time in the restricted region is computed by subtracting the charging time in the non-restricted region B, which is computed using FIG. 5, from the charging time in the SOC range from S1 to Smax, which is computed using FIG. 5.

Thus, when charging is carried out by switching the charging power between two or more levels according to the SOC, the charging power restricted by the charging characteristics of the storage device is compared with each of the two or more charging power levels. In this manner, the charging time can be estimated by a method similar to that of the first embodiment.

Figure 9A:
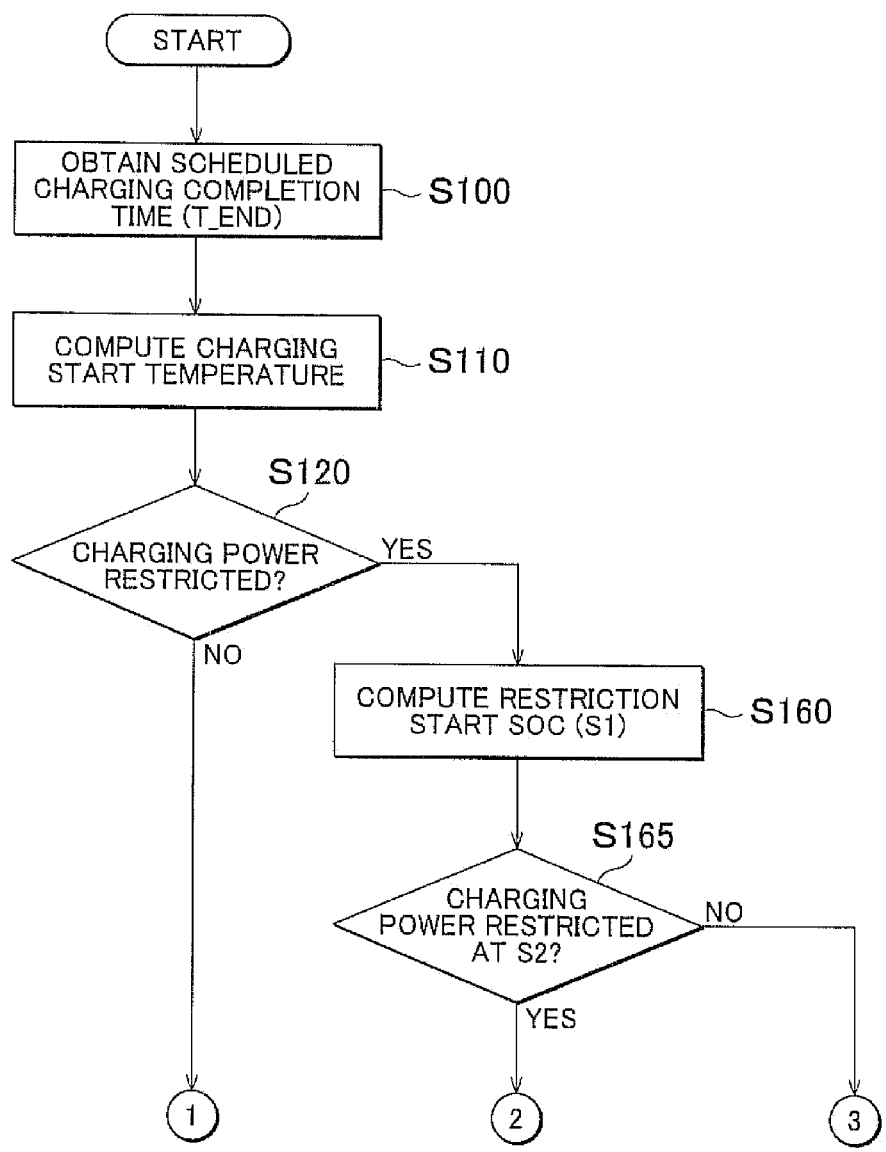
FIGS. 9A and 9B are a flowchart illustrating a charging control process performed by an ECU in the second embodiment.
Figure 9B:
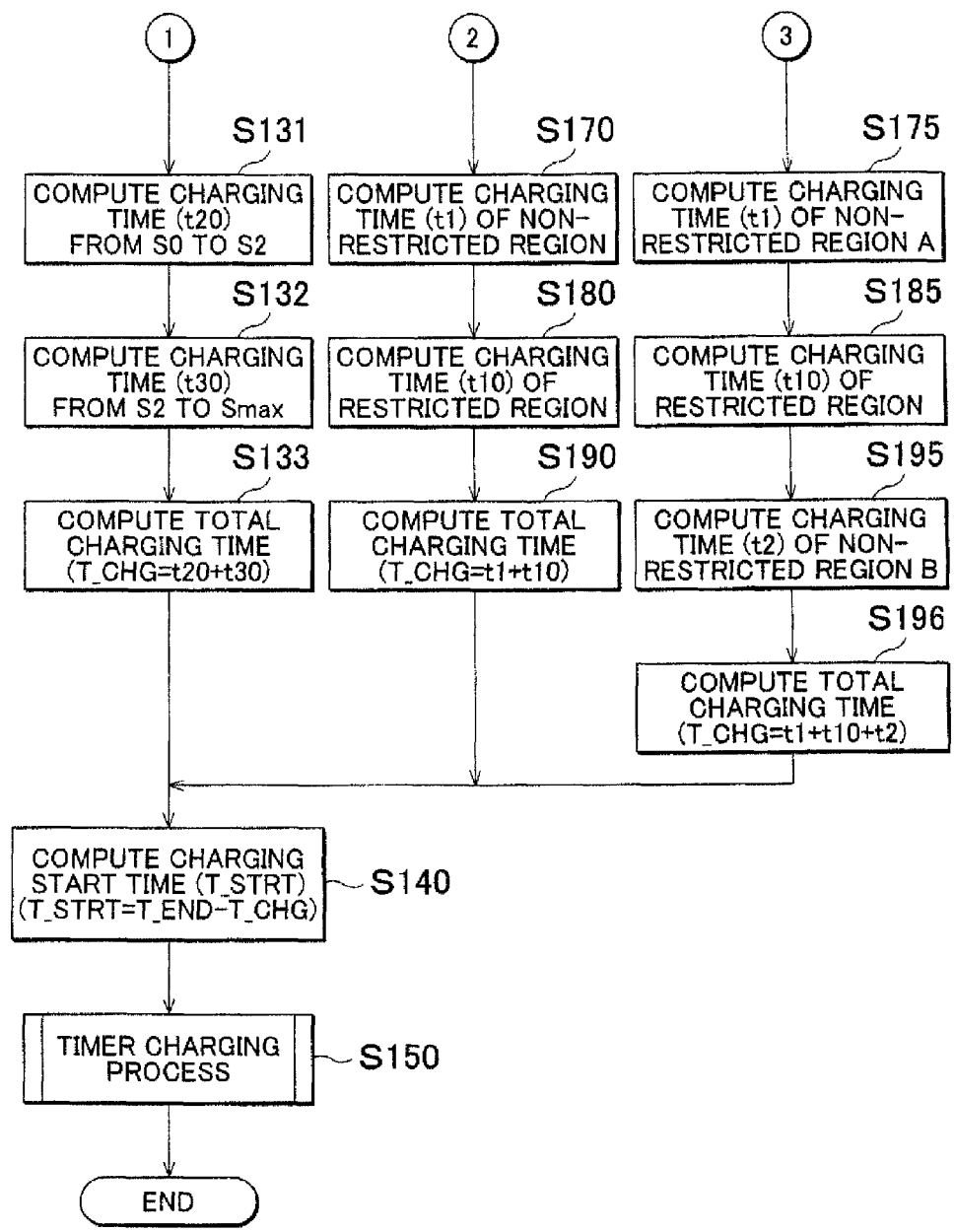

FIGS. 9A and 9B are a flowchart illustrating a charging control process performed by the ECU 300, in the second embodiment. The flowchart of FIGS. 9A and 9B are different from the flowchart of the first embodiment as shown in FIG. 6 in that steps S131, S132 and S133 are added in place of step S130, and steps S165, S175, S185, S195 and S196 are further added. In FIGS. 9A and 9B, the same steps as those included in the flowchart of FIG. 6 will not be repeatedly explained.

Referring to the flowchart of FIGS. 9A and 9B, the charging control process performed by the ECU in the second embodiment will be explained. If it is determined in step S120 that the charging power is not restricted over the entire SOC range (NO in step S120), no restricted region exists. Therefore, the control proceeds to step S131 in which the ECU 300 computes the charging time t20 in the SOC region from S0 to S2, according to Eq. (1). Then, in step S132, the ECU 300 computes the charging time t30 in the SOC region from S2 to Smax, according to Eq. (1). When Eq. (I) is used in step S132, the charging time t30 is computed by replacing S0 with S2, and replacing S1 with Smax.

In step S133, the ECU 300 calculates the total charging time T_CHG by adding the charging times t20 and t30 obtained in steps S131 and S132. Then, the ECU 300 computes the charging start time T_STRT in step S140, and performs a timer charging process, using the charging start time T_STRT.

If, on the other hand, it is determined in step S120 that the charging power is restricted (YES in step S120), the ECU 300 computes the SOC (S1) at which the restriction starts in step S160. Then, the control proceeds to step S165 in which the ECU 300 determines whether the charging power is restricted by the charging characteristics of the electric storage device 110 while the SOC is in the range of S2 to Smax, using the map as shown in FIG. 4. More specifically, in FIG. 4, the ECU 300 determines whether the charging power corresponding to the case where the SOC is S2 in the curve corresponding to the charging start temperature is smaller than the charging power P2. If the charting power at S2 is smaller than the charging power P2, it is determined that the charging power is restricted. On the other hand, if the charging power corresponding to the case where SOC is S2 in the curve is equal to or larger than the charging power P2, it is determined that the charging power is not restricted.

The case where the charging power is restricted (YES in step S165) is represented by the example as shown in FIG. 7, in which the SOC range of S1 to Smax is the restricted region. Therefore, the ECU 300 executes steps S170, S180, S190 similar to those of the first embodiment, so as to calculate the total charging time T_CHG.

The case where the charging power is not restricted (NO in step S165) is represented by the example as shown in FIG. 8, in which the SOC range of S0 to S1 and the SOC range of S2 to Smax are the non-restricted regions A, B, respectively, and the SOC range of S1 to S2 is the restricted region.

Therefore, in step S175, the ECU 300 calculates the charging time t1 in the non-restricted region A, according to Eq. (1). Then, in step S185, the ECU 300 calculates the charging time t10 in the restricted region, using the map as shown in FIG. 5. Further, in step S195, the ECU 300 calculates the charging time t2 in the non-restricted region B, according to Eq. (1). When Eq. (1) is used in step S195, the charging time t2 is calculated by replacing S0 in Eq. (1) with S2, and replacing S1 with Smax. Namely, t30 obtained in step S132 is equal to t2 obtained in step S195.

The ECU 300 computes the total charging time T_CHG by summing the charging times obtained in steps S175, S185 and S195 in step S196. Then, the ECU 300 calculates the charging start time T_STRT in step S140. Then, in step S150, the ECU 300 performs the timer charging process, using the charging start time T_STRT.

Figure 10:
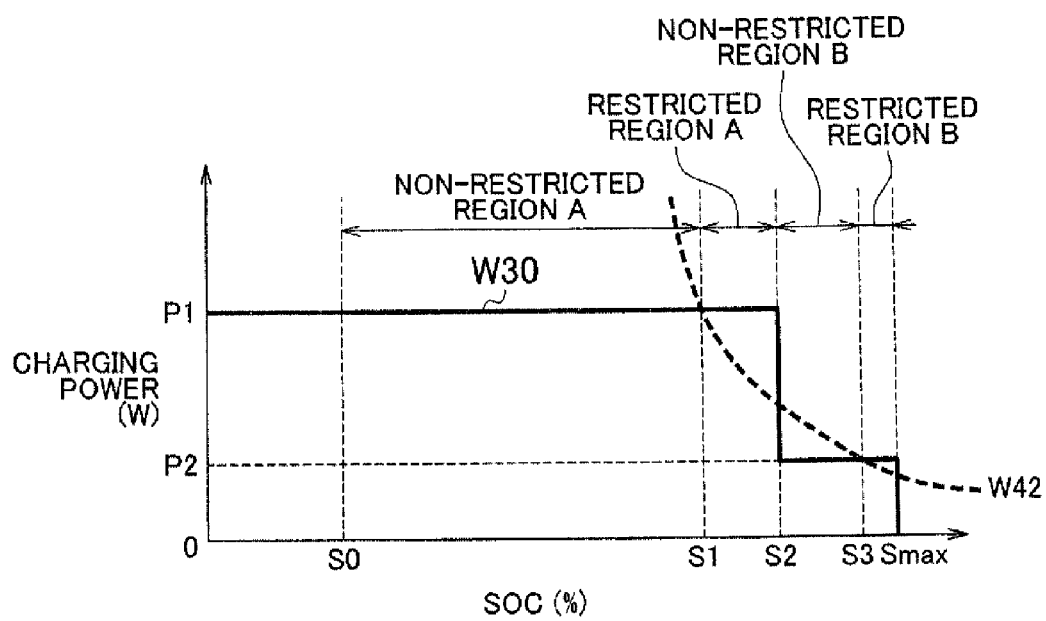
FIG. 10 is a view showing restriction of charging power by SOC, in a modified example of the second embodiment.

Also, even in the ease where a restricted region B (from S3 to Smax) is further present (included) in the SOC range of S2 to Smax, as shown in FIG. 10, the total charging time can be calculated. In this case, a step of determining whether there is SOC (S3) at which the charging power P2 starts being restricted, using the map as shown in FIG. 4, is added to between step S165 and step S175. If the SOC (S3) at which the restriction is started exists, the charging time from S3 to Smax is calculated, using the map as shown in FIG. 5. Then, the total charging time is calculated by summing the charging times in the non-restricted regions A, B and the restricted regions A, B.

By performing control according to the process as described above, the charging time is easily and accurately estimated even in the case where two or more charging power levels are set.

While the charging power is set to a selected one of the two charging power levels in the second embodiment, the charging power may be set to a selected one of three or more charging power levels.

Figure 11:
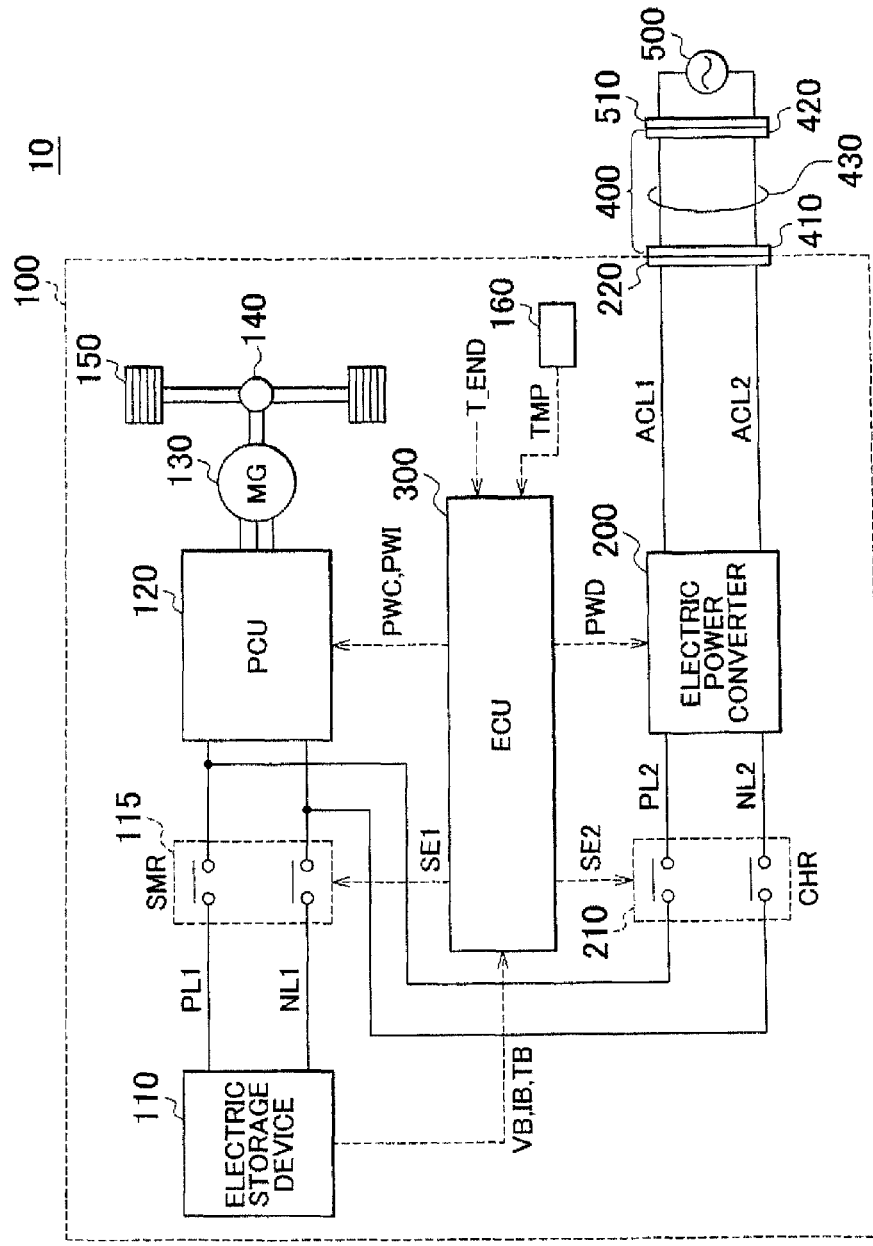
FIG. 11 is an overall block diagram of a charging system according to a modified example of the overall block diagram illustrated in FIG. 1.

In the illustrated embodiments, the electric power converter 200 corresponding to the "electric power supply device" is arranged to convert ac power into dc power. If the electric storage device is charged using dc power supplied from the outside, for example, the electric power supply device need not be arranged to convert ac power into dc power. Namely, the "electric power supply device" in the present invention is only required to supply charging power to the electric storage device, using electric power from the external power supply, while adjusting the charging power. In the illustrated embodiments, the charging completion time is entered by the user. However, the invention is not limited to this mode of operation, but may be applied to a charging apparatus that obtains the charging completion time in another way. The power lines PL2 and NL2 may be respectively connected to the portions of the power lines PL1 and NL1 which are located between the SMR 115 and the PCU 120 as shown in FIG. 11.

The illustrated embodiments are merely exemplary and not restrictive in all respects. It is to be understood that the scope of the invention is not limited by the above description, but defined by the appended claims, and that the invention is intended to cover all changes or modifications within the scope of the invention defined by the appended claims.

What is claimed is:

1. A charging apparatus that charges an electric storage device, the charging apparatus comprising:
   an electric power supply device that adjusts electric power from a power supply, and supplies charging power to the electric storage device; and
   an electronic control unit programed to:
      estimate a first region in which first charging power is supplied from the electric power supply device to the electric storage device,
      estimate a second region, in which second charging power that is smaller than the first charging power is supplied from the electric power supply device to the electric storage device, based on temperature of the electric storage device and a state-of-charge of the electric storage device,
      estimate a first charging time that corresponds to the first region,
      estimate a second charging time that corresponds to the second region,
      estimate a total charging time by using the first charging time and the second charging time,
      obtain a charging completion time, and
      set a charging start time based on the charging completion time and the total charging time.

2. The charging apparatus according to claim 1, wherein the electronic control unit is programed to obtain a charging completion time entered by a user, as the charging completion time.

3. The charging apparatus according to claim 1, wherein the electric power supply device supplies a rated electric power as the first charging power.

4. The charging apparatus according to claim 1, wherein:
   the electric storage device has a temperature characteristic that a permissible charging power is reduced as the temperature of the electric storage device is lower; and
   the electronic control unit is programed to compute a state of charge in which charging start in the second region, based on the temperature characteristic.

5. The charging apparatus according to claim 4, wherein:
   the electronic control unit is programed to compute a predicted temperature of the electric storage device at the charging start time when the charging completion time is entered by the user;
   the electronic control unit is programed to estimate the first charging time based on the predicted temperature; and
   the electronic control unit is programed to compute a state of charge in which charging start in the second region, based on the predicted temperature.

6. The charging apparatus according to claim 1, wherein the control device estimates the first charging time, based on the first charging power, and an amount of change in the state of charge.

7. The charging apparatus according to claim 6, wherein the electronic control unit is programed to estimate the state of charge at which charging using the second charging power is started, using a first map concerning the first charging power and the temperature of the electric storage device.

8. The charging apparatus according to claim 6, wherein the electronic control unit is programed to estimate the second charging time, using a second map concerning the temperature of the electric storage device and the state of charge at which charging using the second charging power is started.

9. The charging apparatus according to claim 1, wherein:
   the electric power supply device adjusts the first charging power to a selected one of a plurality of electric power levels, and supplies the first charging power to the electric storage device;
   the electronic control unit is programed to estimate first charging times for the respective electric power levels, and estimates second charging times for the respective electric power levels; and
   the electronic control unit is programed to estimate the total charging time by summing the first charging times and the second charging times.

10. The charging apparatus according to claim 1, wherein:
    the electronic control unit is programed to determine whether the first charging power is restricted by the second charging power; and
    the electronic control unit is programed to supply the second charging power as the charging power, from the electric power supply device to the electric storage device, when the first charging power is restricted by the second charging power, and electronic control unit is programed to supply the first charging power as the charging power, from the electric power supply device to the electric storage device, when the first charging power is not restricted by the second charging power.

11. A vehicle comprising:
    an electric storage device;
    a drive unit that generates driving force for running the vehicle, using electric power supplied from the electric storage device;
    an electric power supply device that adjusts electric power from a power supply, and supplies charging power to the electric storage device; and
    an electronic control unit programed to:
       estimate a first region in which first charging power is supplied from the electric power supply device to the electric storage device,
       estimate a second region, in which second charging power that is smaller than the first charging power is supplied from the electric power supply device to the electric storage device, based on temperature of the electric storage device and a state-of-charge of the electric storage device,
       estimate a first charging time that corresponds to the first region,
       estimate a second charging time that corresponds to the second region,
       estimate a total charging time by using the first charging time and the second charging time,
       obtain a charging completion time, and
       set a charging start time based on the charging completion time and the total charging time.

12. The vehicle according to claim 11, wherein the electronic control unit is programed to obtain a charging completion time entered by a user, as the charging completion time.

13. The vehicle according to claim 11, wherein the electric power supply device supplies a rated electric power as the first charging power.

14. A method of controlling a charging apparatus that charges an electric storage device, comprising:
    using an electronic control unit to perform the following operations:
       estimating a first region in which first charging power is supplied from the electric power supply device to the electric storage device,
       estimating a second region, in which second charging power that is smaller than the first charging power is supplied from the electric power supply device to the electric storage device, based on temperature of the electric storage device and a state-of-charge of the electric storage device,
estimating a first charging time that corresponds to the first region,
estimating a second charging time that corresponds to the second region,
estimating a total charging time by using the first charging time and the second charging time,
obtaining a charging completion time, and
setting a charging start time based on the charging completion time and the total charging time.

15. The method according to claim 14, further comprising causing the charging apparatus to perform a charging operation on the electric storage device when the time has reached the charging start time.

16. The method according to claim 14, wherein the charging apparatus includes an electric power supply device that adjusts electric power from a power supply, and supplies charging power to the electric storage device.

17. The method according to claim 14, wherein: the charging completion time is entered by a user.

18. The method according to claim 14, wherein the charging apparatus supplies a rated electric power as the first charging power.

* * * * *